Jan. 29, 1946.     G. M. DEXTER     2,393,596
ROOT CONVEYING AND WASHING APPARATUS
Original Filed May 5, 1943     10 Sheets—Sheet 9
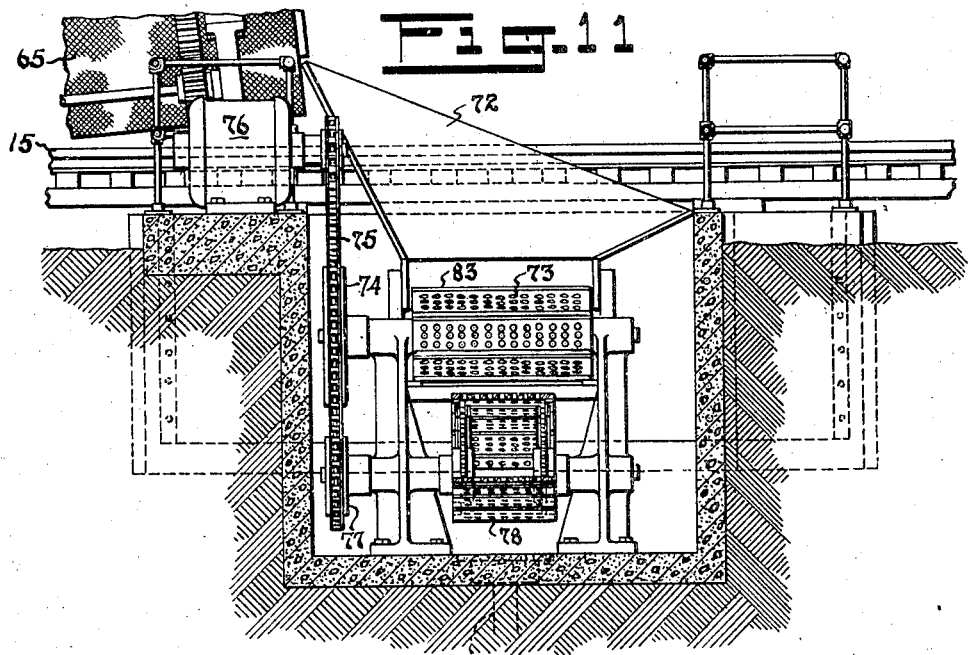
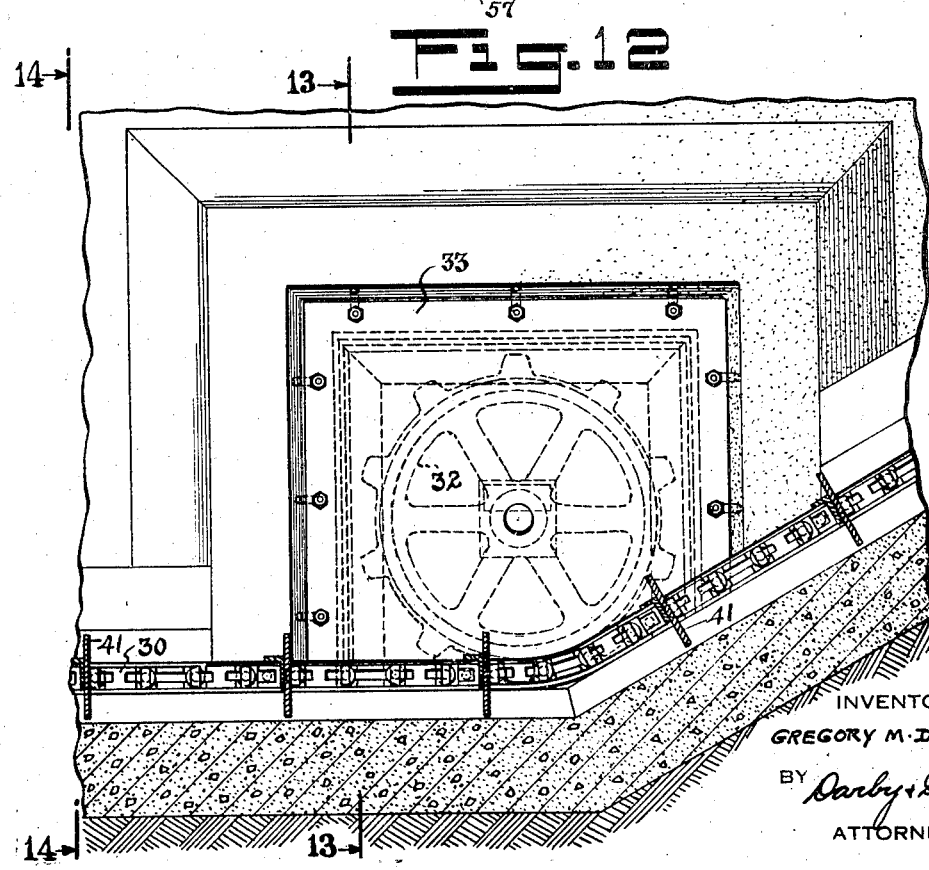
INVENTOR
GREGORY M. DEXTER
BY Darby & Darby
ATTORNEYS

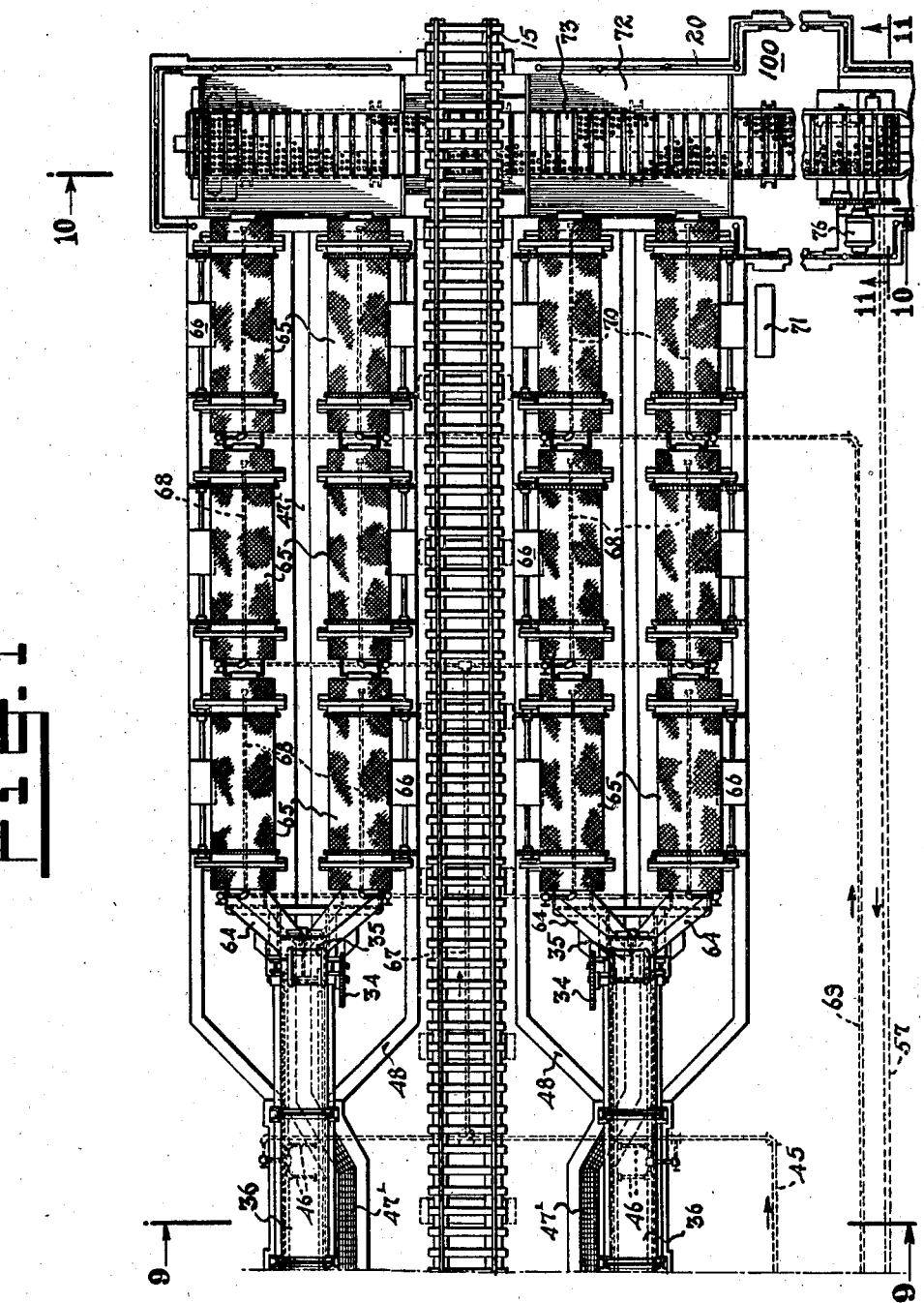

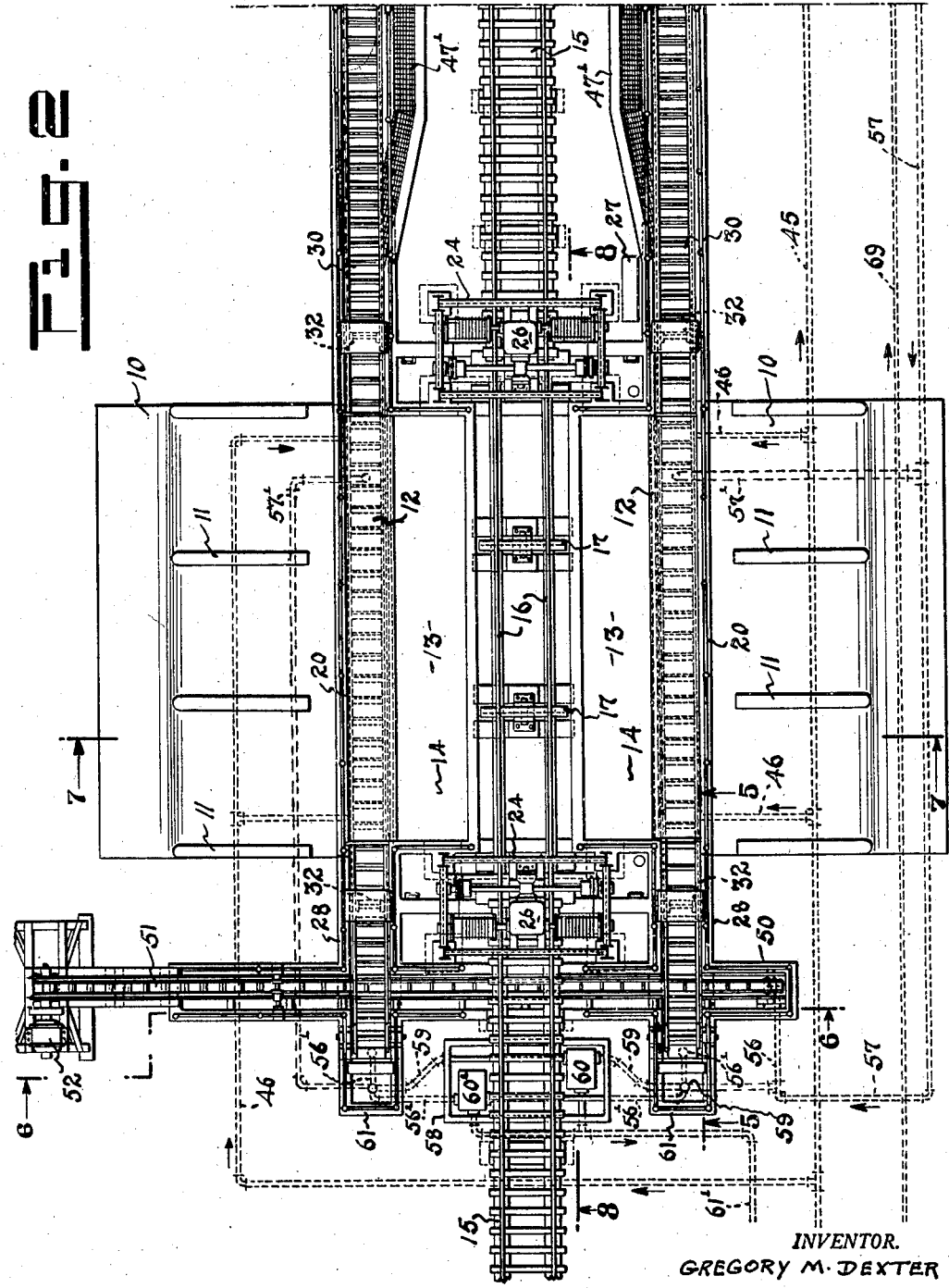

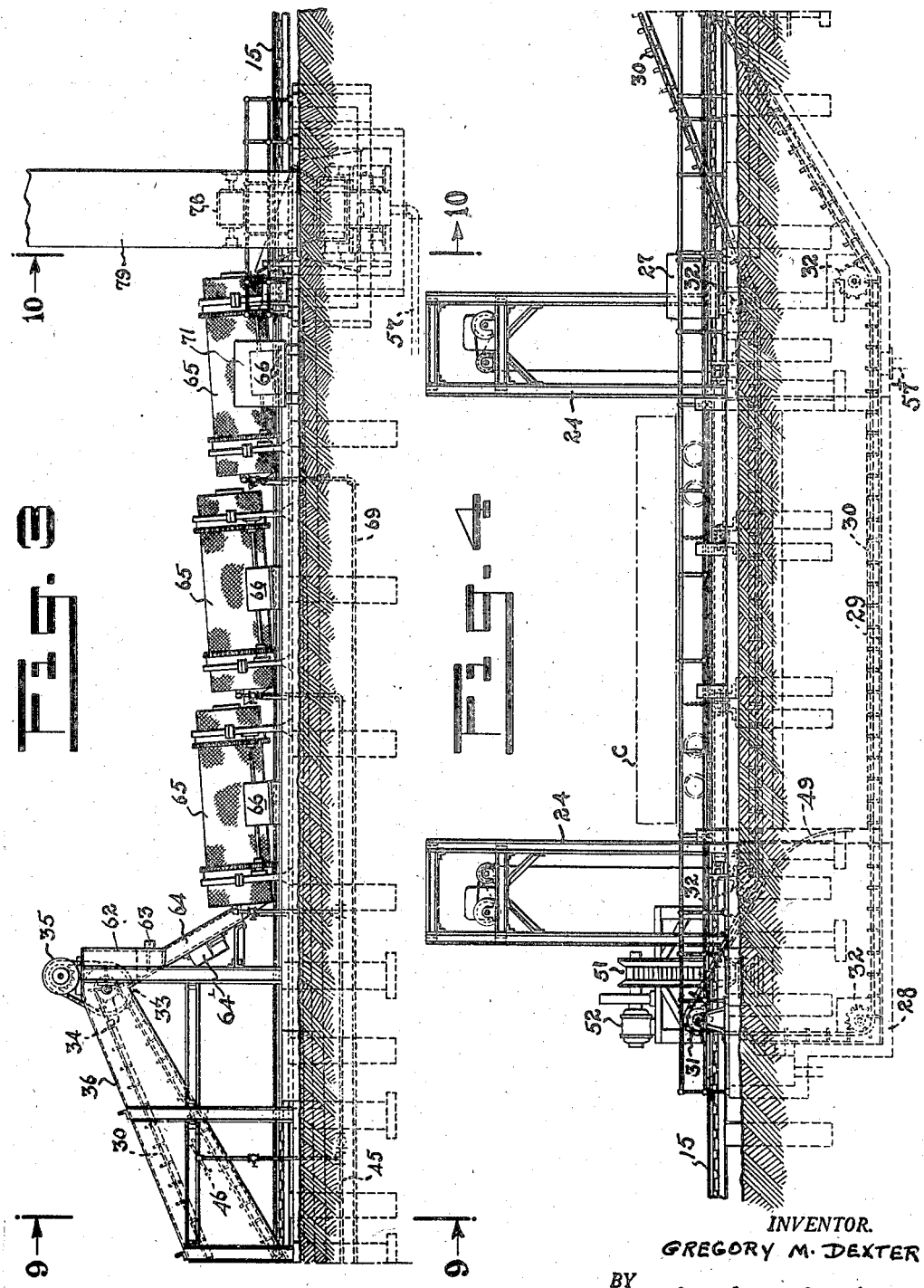

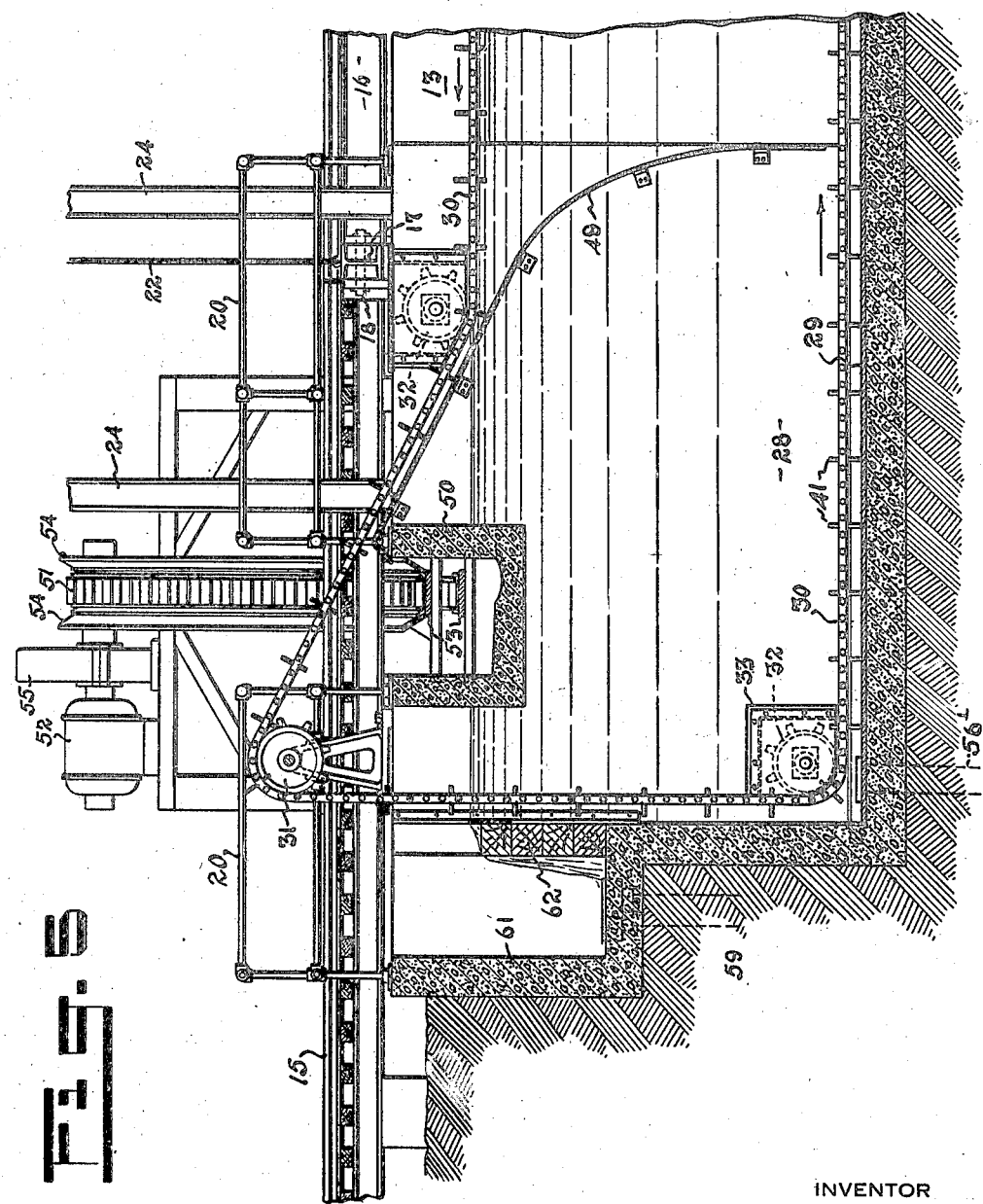

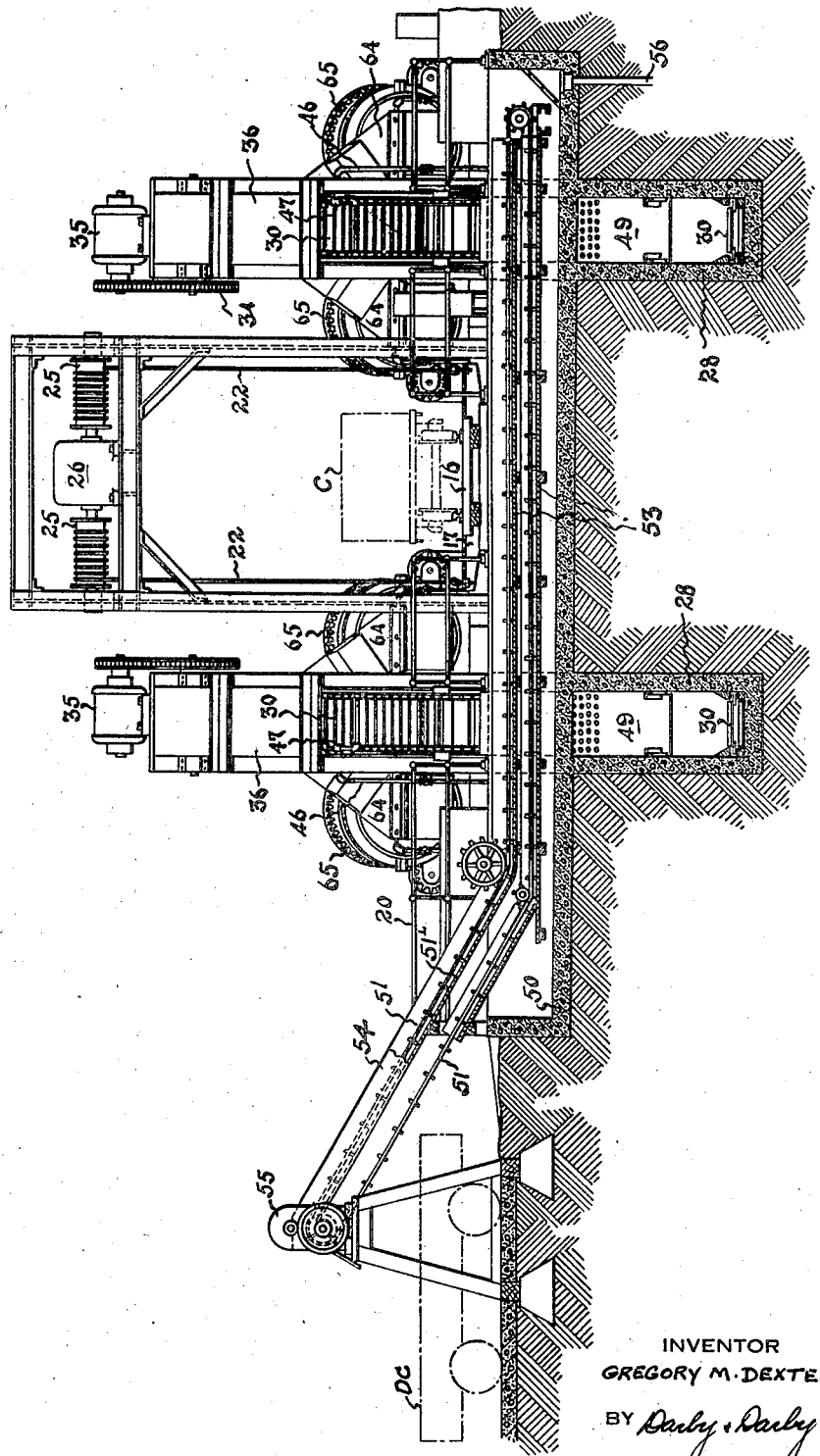

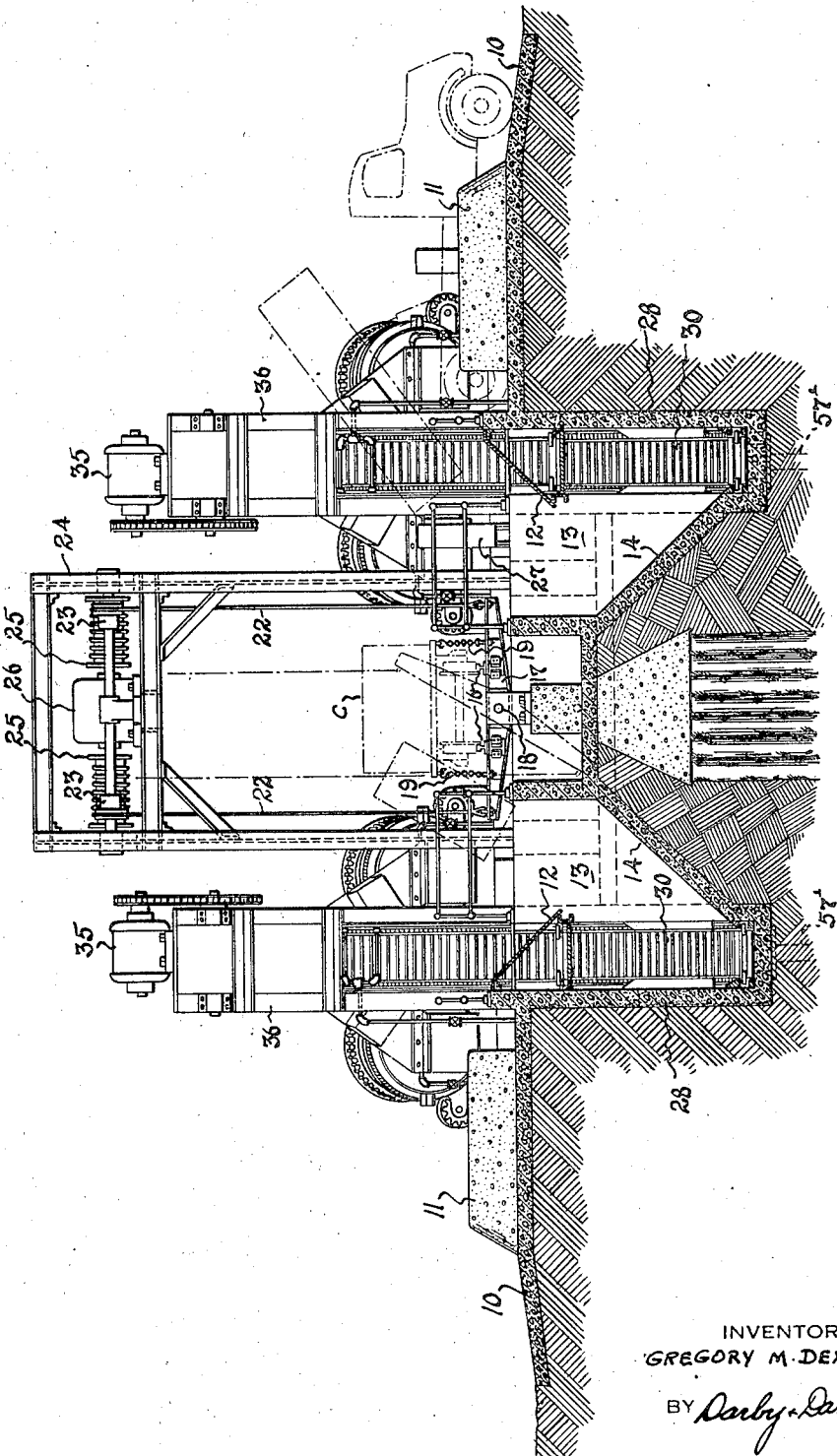

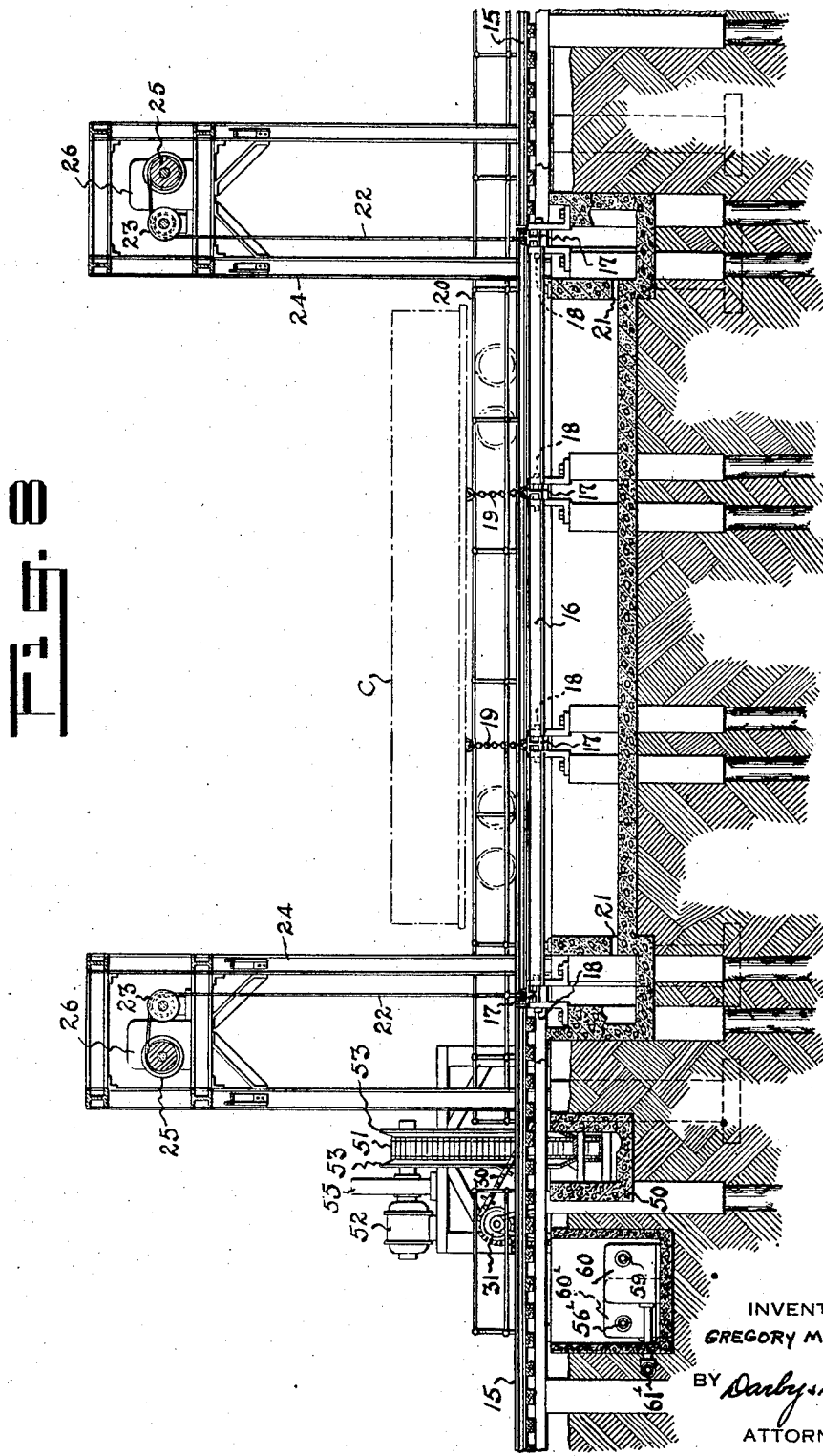

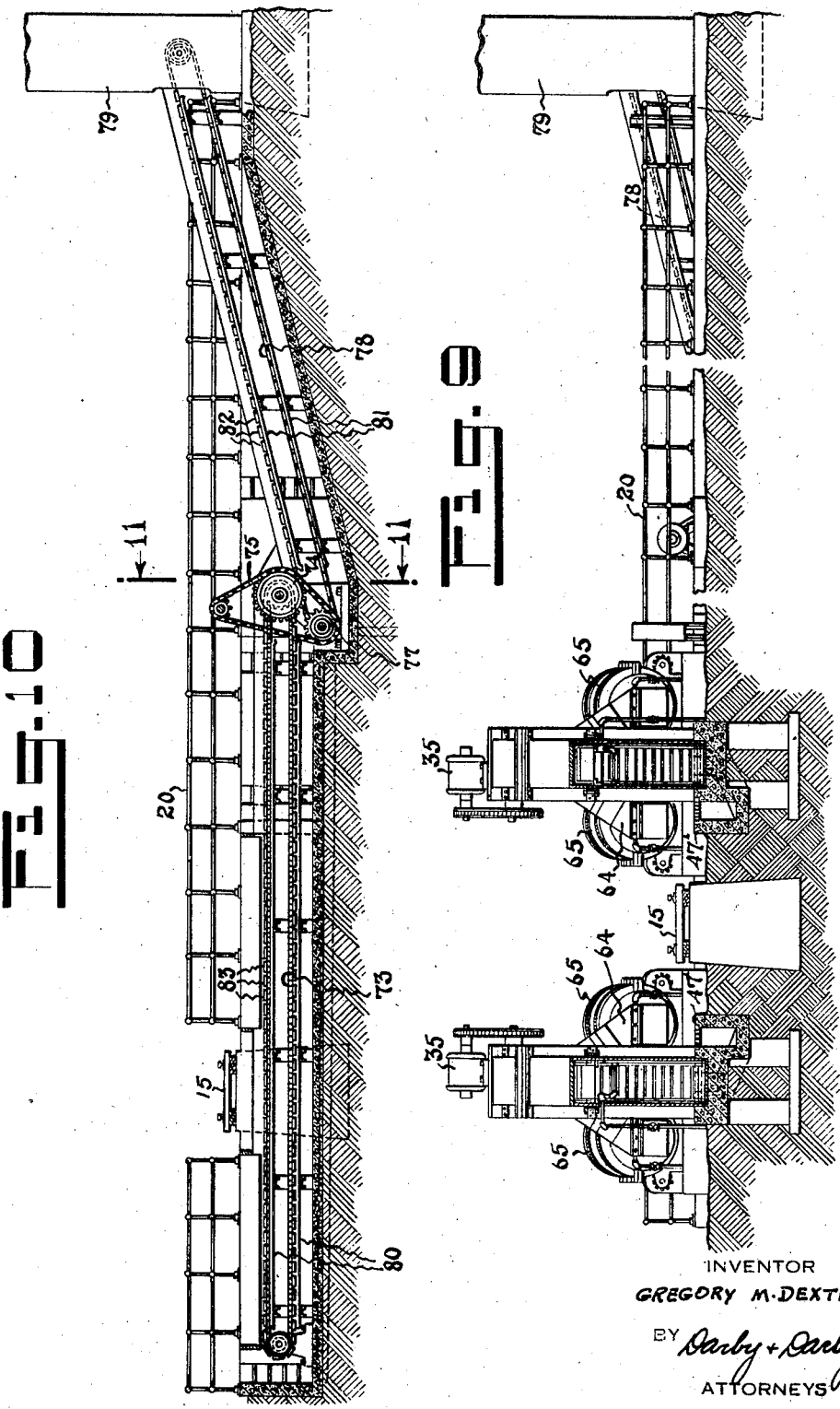

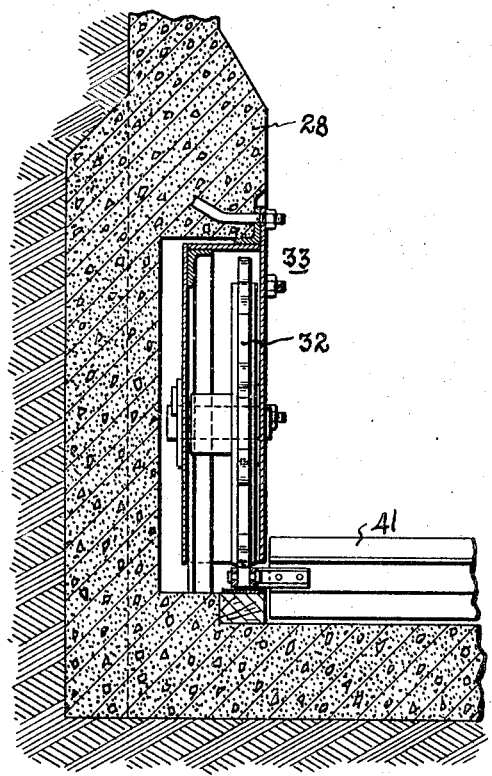
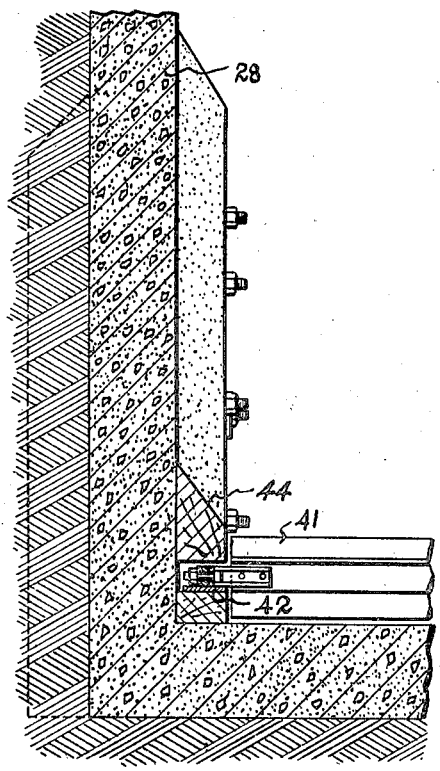
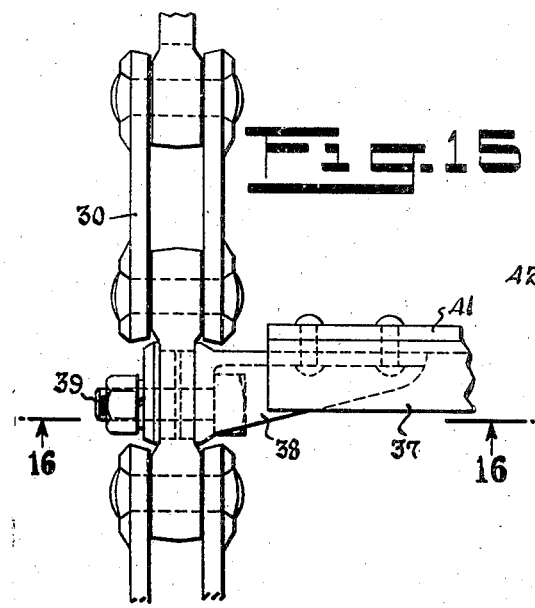
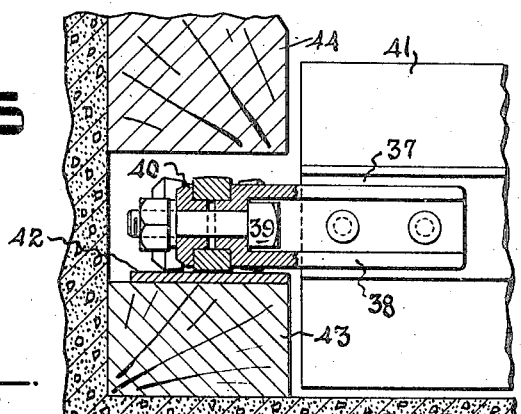
INVENTOR
GREGORY M. DEXTER
BY Darby & Darby
ATTORNEYS Patented Jan. 29, 1946

2,393,596

UNITED STATES PATENT OFFICE 2,393,596

ROOT CONVEYING AND WASHING APPARATUS

Gregory M. Dexter, Scarsdale, N. Y., assignor, by mesne assignments, to United States Sugar Corporation, Clewiston, Fla., a corporation of Delaware Original application May 5, 1943, Serial No. 485,716. Divided and this application December 28, 1943, Serial No. 515,891

5 Claims. (Cl. 51—164)

The subject matter of this invention is related to a cooperative assemblage of devices by means of which dirt covered or mud caked vegetable roots such as potatoes, sugar beets, cassava roots and the like may be cleaned.

The broad general object of this invention is to provide a cooperative association of handling and cleaning devices by means of which large quantities of mud and dirt covered vegetable roots and the like may be rapidly and efficiently handled and cleaned of the adhering dirt and mud at low operating cost.

A more specific object of the invention is to provide a method and apparatus by means of which vegetable roots in substantial tonnage brought directly from the harvest field in bulk may be unloaded without damage by dumping them directly into a body of water to avoid bruising. This water has the further function of subjecting the vegetable roots to a soaking to soften and at least partly remove the mud and dirt caked on the surface thereof.

A more detailed object in respect to the delivery of vegetable roots to the washing pit is to provide mechanism by means of which loaded railway cars may be bodily tipped to discharge their contents into the pits, and arrangements are made, when it is so desired, to discharge vegetable roots into the soaking pits directly from dump trucks.

A subsidiary object, at this stage of the process, is to effect an efficient separation of the vegetable from the foreign material mixed therein and from some, at least, of the softened coating of mud.

A further object of the invention is to provide conveying equipment associated with the soaking pits for conducting the roots first through washing sprays, then through distributing mechanism, at which point they pass through a magnetic field to remove any tramp iron, into rotary and/or scrubbing washers which progressively move them in subdivided streams (if desired) to a collecting point.

A further object of the invention is to provide handling and conveying mechanism at the point of discharge from the rotary and/or scrubbing washers for delivering the roots in a manner so that they may be inspected prior to any further treating or processing, the nature of which we are not concerned with here.

A still further object of the invention is to provide mechanism by means of which the floating trash, separated from the roots in the soaking pit, is assembled, removed therefrom, and delivered to a collection point for disposal.

Another object of the invention is to provide an interconnected water circulating system including pipes, pits and pumps by means of which the very large quantities of water (and contained dirt) required in such a process may be recovered, purified and returned (at least in part) for use in a substantially closed circulatory system.

These and other but more detailed objects are successfully secured by means of the mechanism herein described in connection with the attached drawings illustrating one embodiment of the invention.

This invention resides substantially in the combination, construction, arrangement, relative location of parts, steps and series of steps, as will be described in detail below.

This application is a division of my copending application Serial No. 485,716, filed May 5, 1943.

In the accompanying drawings,

Figures 1 and 2 taken together provide a plan view of the mechanism comprising the system of this invention;

Figure 3 is a side elevational view of the mechanism illustrated in Figure 1;

Figure 4 is a side elevational view of the mechanism illustrated in Figure 2;

Figure 5 is an enlarged cross-sectional view taken on the line 5—5 of Figure 2;

Figure 6 is an enlarged cross-sectional view taken on the line 6—6 of Figure 2;

Figure 7 is an enlarged cross-sectional view taken on the line 7—7 of Figure 2;

Figure 8 is a cross-sectional view taken on the line 8—8 of Figure 2;

Figure 9 is a cross-sectional view taken on the line 9—9 of Figure 3;

Figure 10 is a cross-sectional view taken on the line 10—10 of Figure 3;

Figure 11 is an enlarged cross-sectional view taken on the line 11—11 of Figure 10;

Figure 12 is an enlarged side elevational view of a housing for one of the chain conveyor sprocket wheels showing some parts broken away and some parts in vertical cross-section;

Figure 13 is a cross-sectional view taken on the line 13—13 of Figure 12;

Figure 14 is a cross-sectional view taken on the line 14—14 of Figure 12;

Figure 15 is a detail plan view of a portion of the conveyor chain construction; and Figure 16 is a cross-sectional view taken on the line 16—16 of Figure 15.

Those familiar with the handling of vegetable roots such as potatoes coming directly from the harvest field are aware of the requirement, regardless of the use to which the roots are to be put, of removing the mud and dirt caked on the surface thereof as well as the trash and other foreign material mixed therewith. For example, whether potatoes are to be processed for the recovery of their starch content or for fermentation preparatory to distillation, they must be handled in very large quantities. Economic considerations, of course, require that they be cleaned, without bruising, as rapidly and as cheaply as possible. In view of the large tonnages which must be handled daily, it will be apparent, upon careful consideration, that a rather complex problem is posed in providing a continuous method and apparatus for economically cleaning the potatoes without bruising them.

In accordance with the subject matter of this invention, washing and conveying equipment have been assembled and functionally associated so that very large tonnages of roots brought directly from the harvest field can be economically cleaned with a minimum of manual labor and without damaging them. The exact nature of this subject matter will be best understood by detailed reference to the drawings attached hereto and reference is now made to these drawings.

The complete system is illustrated in considerable detail in Figures 1 and 2 when taken together. The system illustrated is adapted to receive the potatoes (for example) in bulk either directly from suitably constructed railway cars or from large dump trucks. There is illustrated (Figure 2), therefore, at 10 a pair of oppositely extending truck ramps provided with barriers 11 to define truck stalls by means of which the truck operators may align their trucks for dumping without interference with each other. These ramps extend in opposite directions from a pair of soaking pits 13 each of which is preferably constructed, as well illustrated in Figure 7, with a downwardly inclined wall 14 which leads to a constricted bottom section for purposes to be referred to later. It is important to note, as will be clear from Figure 7, that the potatoes will fall from the dump trucks directly into the body of water contained in the pits 13. This minimizes the danger of unduly bruising the potatoes at this stage of handling.

These pits may be equally well served by railway cars and for this purpose the pits are arranged so that a railway track 15 extends longitudinally between the two pits so that the cars may be received into the apparatus from one end and removed from the other end to accomplish unrestricted movement of the cars. Between the soaking pits 13 is a section 16 of the track which is mounted on a number of transverse beams 17 (see, for example Figure 7) which are pivotally mounted at 18 on a suitable supporting face so that there is formed a cradle or a basculator table which may be transversely tipped in either direction. The outline of a car is illustrated at C and, as shown best in Figure 7, the car is held on the cradle during tipping by means of clamping struts or chains 19 as shown.

As illustrated in several of the views, a power driven mechanism is provided for tipping the basculator in either direction. It includes a vertically extending rectangular framework 24. At this point, it may be well to note, as is apparent from the drawings, that in most instances the mechanism is symmetrically disposed with regard to a longitudinal central line and is the same on each side thereof. For this reason the same reference numerals have been applied to the corresponding elements of each section and, therefore, only one element will be individually described, it being recognized that a corresponding element is present on the opposite side of the track system.

On top of the framework 24 are a pair of guide pulleys 23 which are rotatably and slidably mounted upon a supporting shaft, as is clear from Figure 7. The function of these pulleys is to guide the steel cables 22, which are attached at their lower ends in pairs to the opposite ends of the beams 17 at the ends of the cradle. As is clear from Figure 8, this mechanism is duplicated at each end of each cradle. The cables 22 are directed by the pulleys 23 to a pair of cable drums 25 which are driven by means of a motor 26. For the sake of completeness a control station for the motor 26 is diagrammatically illustrated at 27 in Figure 7. In passing it is noted that the pair of motors 26 at the ends of each basculator are of a type or are tied together under the control at 27 so that they rotate in synchronism to insure equalized tipping of the basculator at each end. It will be noted that the cables 22 are connected to their respective drums so that upon rotation of the drums in the same direction by the motor 26, one cable will be wound on its drum as the other cable unwinds from its drum. The reason for this is, of course, apparent and is illustrated by the dash-dot lines in Figure 7.

It will be seen also from Figure 7 that the structure includes a pit under the basculator into which any moisture either from the car or during the rainy season may collect and from which it may drain through the drainage ports 21 (see Figure 8). It may also be noted at this point, as illustrated in the various figures, that there is provided a suitable protective railing 20 about the entire apparatus.

As will be seen from Figures 2, 5, 6 and 7, for example, the receiving and soaking pits 13 have inclined deflecting walls 14 so that the potatoes are brought into the path of travel of a flight conveyor 30, which lies partly in the longitudinal pit extensions 28, as clearly shown in Figure 5. The conveyor has a plurality of transverse bars or flights 41 which slide along the bottom of the extension pits 28 on plates 29 preferably of metal. This conveyor travels in the direction of the arrows, as indicated in Figure 5, and is driven by a motor 35 provided with a sprocket wheel driving a chain and a larger sprocket wheel on a shaft which supports a pair of smaller sprocket wheels 34 which engage the chains of the flight conveyor 30, see Figure 3. The sprocket wheels 34 rotate in a counter-clockwise direction so that the lower course of the conveyor travels upwardly (Figure 3) along one wall of a housing 36. The upper course of the conveyor travels back to a pair of sprocket wheels 32 (see Figure 4) so that the portion thereof extending between these wheels travels in a horizontal plane in a position so as to move along the top of the body of water in the pits 14 and 28, as illustrated in Figures 4 and 5. This portion of the conveyor is positioned with respect to the surface of the water in the pit so as to be partially submerged and, therefore, collect and convey any trash floating on the surface of the water into the narrow extension pit 28. One of the guiding sprocket wheels 32 is mounted in this pit and from there the upper course of the conveyor passes to a sprocket wheel 31 so that that portion travels upwardly, as clearly indicated in Figure 5. It will be recalled, as illustrated in Figure 2, that the sprocket wheels 31 and 32 are arranged in pairs so as to engage the chains defining the sides of the conveyor. From the sprocket wheels 31 the conveyor passes downwardly in a vertical direction to the pair of sprocket wheels 32 at the bottom of the extension pit 28 so as to guide the lower course of the conveyor along the plate 29 at the bottom of the pit. This lower course passes back to a similar set of sprocket wheels 32, as shown in Figure 4 to the point where it is deflected upwardly to the power driven sprocket wheels 34. As will be seen from Figures 2 and 7, the conveyor 30 passes beneath a protecting plate 12 so that potatoes may not fall directly on the conveyor.

At this point, it will be helpful to refer to Figures 12 to 16, inclusive, which show details of the conveyor and guiding sprockets. Each of the sprocket wheels 32 is normally positioned so as to be fully or partially submerged in water and are placed within protecting housings 33 so that potatoes and trash may not come in contact with them. Figures 12 and 13 show how these housings are attached to the walls of the pit which are shaped to form recesses for them. These sprockets are, of course, idler sprockets and are driven by the chain. There is illustrated in Figures 13 to 16, inclusive, one example of the construction of a suitable conveyor. Each conveyor comprises a pair of chains composed of links pivotally connected together. Opposite pairs of links support the transverse flights or bars 41. These flights consist of plates which are secured to angle iron supports 37 attached at their ends to suitably shaped brackets 38. The brackets 38 are attached to the links by means of bolts 39. The brackets and bolt heads are complementarily shaped so that the bolts may not turn in the brackets and the washers 40 which engage the links on the sides opposite to the brackets have a rectangular portion which fits in the links so that they likewise may not turn. Thus when the flights are clamped on the chains they are prevented from turning and working loose. The longitudinal separation and the shape of the flights may be varied as practice requires.

The path of travel of the chains of the conveyors may be enclosed, as illustrated in Figure 16, by supporting stringer 43 and protecting stringer 44. Bearing plates or strips 42 are mounted on the stringers 43 on which the chains may slide. As illustrated in Figure 14, the upper surface of the stringers 44 are inclined downwardly so as to direct any potatoes at the sides of the conveyor back into the path of action of the conveyor.

In the housing 36 (see Figures 1 and 3) are provided water sprays 46 which are connected to a fresh water supply line 45 coming from the water purifying and cleaning apparatus (not shown). The water is drained from the housing 36 back into grill covered gutters 47' by means of which it drains back into the soaking pits. The drainage gutters 47' extend to the right (Figure 2) between the washers so as to also collect and return the water from them back to the soaking pits. For purposes of clarity, it may be noted that the elements 48 are concrete curbs around the concrete apron underneath the rotary washers.

Returning now to Figures 5 and 6, each extension pit 28 is provided with a deflecting plate or wall 49 which starts from a point close to the lower course of the conveyor 30 and extends upwardly, as illustrated in Figure 5, first on a curved line and then on a straight line in a position so that the upper flight of the conveyor 30 as it leaves the surface of the water contacts therewith. By means of this relationship, the material floating on the surface of the water and being moved by the conveyor is carried upwardly along the plate to the end thereof from which it is discharged into a transverse pit 50 which will be referred to later.

The portion of the plate 49 near the surface of the water is perforated, as shown in Figure 5, so that water currents may travel to the discharge end of the pit which is formed in part by means of a weir or dam 62 of adjustable height. The wall 49 extends downwardly at the mouth of the narrow extension pit 28 to prevent potatoes dumped in the pit 13 falling into the extension pit and for insuring circulatory movement of the water to the top and through the perforations provided in it. The extension pit 28 has an integral trough 61 into which the water from the pit may discharge over the weir and from which it may be withdrawn by a pipe 59 through which it travels to the intake of a pump 60.

In the pump pit 58 with the pump 60 is a large pump 60' connected by the pipes 56' to the soaking pits 13 and their extensions 28 so that they may be drained whenever it is desired to clean these pits. It may be noted, as shown in Figure 2, that they may be flushed out through connections 57' and 57 for return to pump 60 by pipe 59. The fresh water supply line 45 is used to fill the pits through the branches 46 and for flushing out the pits. Pumps 60 and 60' have a common discharge connection 61' which extends to the water settling apparatus for settling out the mud from the water (not shown). For purposes of distinction, it may be noted that pump 60 is relatively small since it only has to handle the drainage of the water normally circulating through the pits while pump 60' should preferably be large enough so as to be capable of draining the soaking pits very rapidly. The pipes 45 and 46 should have a capacity large enough so that the pits may be rapidly filled in the interests of efficient operation.

In the transverse pit 50 (as shown in Figures 2, 5 and 6) there is a flight conveyor 51 which extends in a horizontal direction along the pit and is held by means of guide sprockets (as shown in Figure 6) so as to travel along a pair of supporting plates 53. This conveyor extends upwardly to a sprocket wheel driven through a reduction gearing 55 by means of the motor 52. The upper course of the conveyor extending to the elevated motor station is provided with a pair of side walls 54 to confine the trash and foreign material conducted by the conveyor from the pit 50 to a point where it may be discharged into a dump cart DC for disposal (see Figure 6). Attention is called to the fact that the supporting plate 53 for the upper course of the conveyor extends all the way to the discharge point of the conveyor, as illustrated at 51', so that the flights of the conveyor can carry the collected foreign material from the pit 50 to the point of discharge into the dump cart. Drainage from pit 50 passes by pipe 56 into pipe 57.

Attention is now directed to Figures 1 and 3 to the point where the washed and sprayed potatoes are delivered by the flight conveyor 30 into a chute 62 which is provided with a pair of branches 64 controlled by means of a flap valve 63 by means of which the potatoes may be directed into either branch or distributed equally to both. On the back of each branch is diagrammatically illustrated an electromagnetic type of separator which creates a sufficiently strong electrical field to trap any tramp iron mixed with the potatoes. The branch chutes deliver into the receiving ends of the rotary washers 65 in each line of which there is illustrated three. The number of washers in each section will, of course, be subject to variation depending upon the tonnage to be handled, as will the type of washer depending upon the cleanliness required. It is contemplated that in some cases brush washers may be used in conjunction with one or more rotary washers to meet the requirements of a particular installation. These washers are driven by the motors 66, as illustrated, which may be controlled as required from a control station 71.

The spray water supply line 45 has branches, as illustrated in Figures 1 and 3, for delivering water to the washing sprays 68 in the first two washers of each line. The water delivered to these washers from the line 45 need not be specially purified, it being suitable for the purpose if it has been subjected to a settling process to remove all solid content. However, as will be seen best from Figure 1, the spray water for the sprays 70 to the last washers of each line is supplied through a pipe connection 69 which comes from a special part of the water purifying system. This water, used for the final washing, is preferably softened and freed from bacteria which would be objectionable in this process. The sprays 46, 68 and 70 are high pressure sprays to aid in dislodging any dirt remaining on the potatoes.

It will be noted, as illustrated in Figure 3, that the washers are arranged so that the potatoes will be progressively fed from each machine to the next machine and finally by discharge from the last machine of each line into the hoppers 72 which direct them on to a perforated conveyor 73 extending transversely of the washing equipment. This conveyor is an apron conveyor composed of a plurality of perforated slats 83 suitably supported to form an endless conveyor (see Figure 11). As illustrated in Figure 10, the courses of the conveyor 73 are supported on plates 80 along which they may slide and, of course, are supported by pulleys or sprocket wheels at their ends. The conveyor 73 discharges on to a perforated conveyor 78 of any suitable type which extends upwardly to a vertical elevator 79 diagrammatically illustrated. This conveyor 78 is also illustrated as of the apron type composed of the perforated slats 82. The courses of this conveyor are supported by plates 81 over which they slide. These two conveyors are driven by means of a motor 76, best illustrated in Figure 11, having a sprocket which drives a chain 75 engaging the driving sprocket 74 for the conveyor 73 and the driving sprocket 77 for the conveyor 78. As may be noted from Figure 1, at 100 the pit for these conveyors is widened at a point in advance of the discharge point of the conveyor 73 so that operators may be stationed thereat for the purpose of inspecting the washed potatoes in order to remove any trash or badly damaged potatoes that may have got by other detention devices. It will be noted from Figures 1 and 11 that the pit containing these conveyors is provided with a drainage return connection 57 which returns to the intake of pump 60.

The method of processing potatoes with the apparatus herein disclosed is fairly apparent from the foregoing detailed description of the embodiment of the invention herein illustrated. For purposes of review and emphasis, it is believed, however, that the method may be summarized here. The freshly harvested potatoes caked with dirt and mud are brought in either by railway car or auto truck to the soaking pits into which they are dumped. One feature of the arrangement herein disclosed resides in its flexibility and ability to handle relatively large quantities of potatoes with facility. With pit arrangement, as shown, it is contemplated that railway cars suitably constructed can be alternately emptied into the pits about one every eight minutes. If such a car had a capacity of twenty-five tons of potatoes, the hourly capacity of the two pits would be nearly two hundred tons of potatoes allowing a sixteen minute soaking period.

The potatoes being dumped directly into a large body of water are not liable to be damaged or bruised. The dirt on the surface thereof is gradually softened and is free to fall away. Any contained trash which will float will collect at the top of the pits. The potatoes themselves sink to the bottom of the pits where they are engaged by the conveyor 30.

Since large quantities of potatoes will be dumped into the pit at any one time, provision must be made to maintain the water level in the pit at the upper course of the flight conveyor 30 so as to gather the floating trash for disposal. One feature of this invention is the provision of properly proportioned pipes and pumps, that is the pump 60' and the supply pipe 45 and its branches 46, so that water can be discharged from and delivered to the pits very rapidly. These pipes and pumps will be designed of sufficient capacity so that they can handle the entire contents of one pit at least at speed at which cars can be spotted and emptied. For example, just prior to the dumping of a batch of potatoes into one of the pits, the water level would be reduced to the point where, when the potatoes are dumped therein, it would rise back to the upper course of the conveyor 30. As potatoes gradually leave the pit additional water will be returned to the pit to maintain the required water level and, in fact, sufficient additional water will be introduced so that the excess thereof will flow over the weir 32 and create currents in the pits towards the left hand end thereof (Figure 5). Thus all forces will be acting to move the floating trash toward the plate 49 which cooperates with the conveyor to permit its discharge into the pit 50. Generally speaking, potatoes as delivered are sound and in good condition, but for starch making purposes potatoes that are partly decayed are not objectionable. Such decayed potatoes, however, are likely to float and hence can be made to drop down to the conveyor by pumping out some of the water in the pits. Of course, as was apparent from the previous description, the material discharged into the pit 50 is carried away by the conveyor 51 to the dump truck DC.

The partially cleaned potatoes settle onto the lower course of the conveyor 30 and are conducted alternately from the pits to the hoppers 62. On their way to these hoppers, they are sprayed with fresh water by means of the sprays 46, the spray water returning by means of the gutter 47' to the pits 13.

From this hopper they are distributed to the rotary washing machines where they are sprayed as previously explained, so that any remaining dirt is softened and knocked therefrom. In the case of brush washers, they will be thoroughly scrubbed so that when they are discharged onto the apron conveyor 73, they will be thoroughly clean. The various sprays referred to are desirably of the high pressure type so as to forcibly clean the surface of the potatoes.

In the case where the potatoes are to be used for the recovery of their starch content, it is highly desirable that they reach the starch making processes in a thoroughly clean condition so as not to complicate the operation of the equipment at the starch plant. This requirement for cleanliness is not so important where the potatoes are to be used as a source of alcohol in a distillery.

On their way to the elevator or other transfer equipment they may be given a final inspection for the purpose of picking out any foreign material that may have gone through with them. It will be recalled that any pieces of iron and the like will have been separated by the magnetic separators 64'. The spray water at the washing machines will, as previously explained, be returned by means of the gutters 47' to the soaking pits.

Of course, the equipment will be placed at the proper levels for drainage and the individual elements will be so pitched as to facilitate drainage especially during cleaning operations. For example, the soaking pits (Figure 4) will be pitched towards the drainage connection 57' (see Figures 2 and 4) so that the water and mud may be withdrawn therefrom by means of the pump 60. Suitable stone catchers will be provided in the bottom of the soaking pits or on their sloping walls at the discharge end.

It will be seen, therefore, that large quantities of dirty potatoes may be efficiently and economically handled in a substantially continuous process which will insure the thorough cleaning thereof with a minimum labor item.

From the above description it will be apparent to those skilled in the art that the subject matter of this invention is capable of substantial variations without departure from the main objects and functions thereof. I do not, therefore, desire to be strictly limited by the particular embodiment herein disclosed for illustrative purposes, but rather by the scope of the claims granted me.

What is claimed is:

1. In an apparatus for processing vegetable roots, the combination including a flight conveyor for receiving and transporting the roots to an elevated point, a branched downwardly inclined duct to receive the roots from said conveyor, means for directing the roots through one or the other of the branches of said duct, and two groups of washing means respectively positioned to receive the roots from either of said branches.

2. In the combination of claim 1, means for spraying water under high pressure on the roots while on said conveyor.

3. In the combination of claim 1, each group of said washing means including a plurality of rotary tumblers arranged to receive the roots in succession.

4. In the combination of claim 1, each group of said washing means including a plurality of rotary tumblers arranged to receive the roots in succession, and means for spraying water under high pressure on the roots while in each tumbler.

5. In the combination of claim 1, means associated with said duct for removing magnetizable objects mixed with the roots.

GREGORY M. DEXTER.